April 15, 1969 L. P. GAU ET AL 3,439,250
VOLTAGE REGULATOR
Original Filed July 24, 1963 Sheet 1 of 2
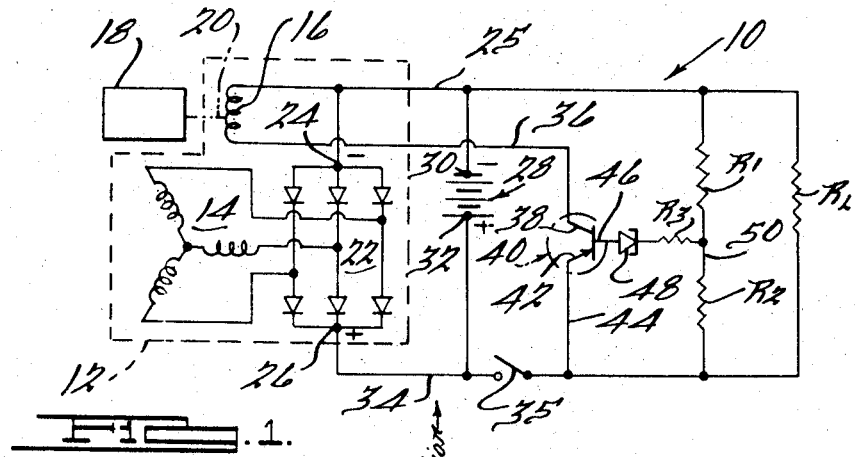
FIG. 1.
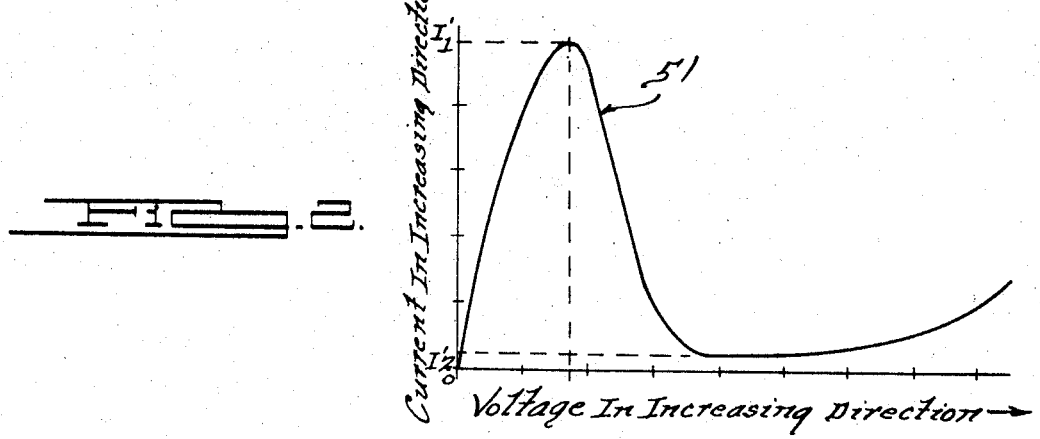
FIG. 2.
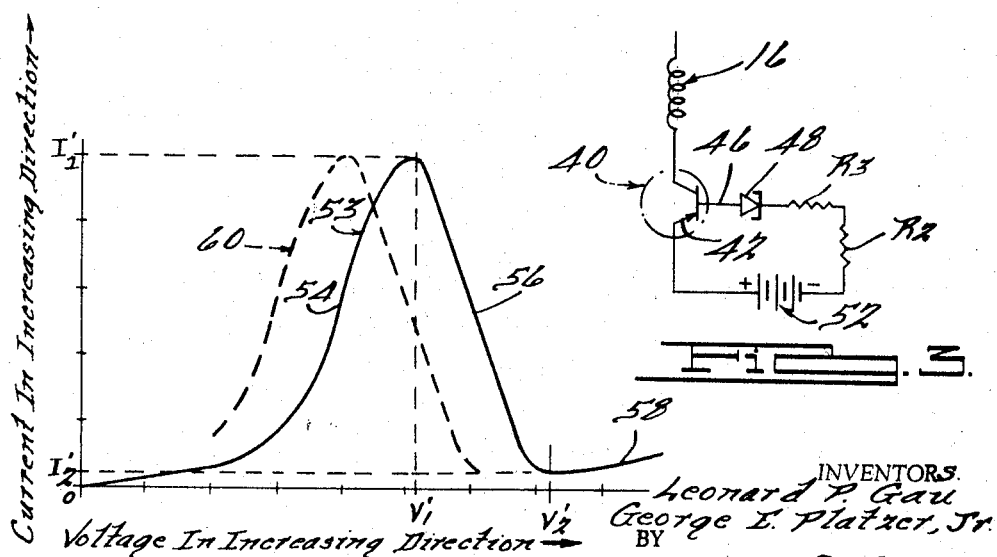
FIG. 3.
FIG. 4.
INVENTORS.
Leonard P. Gau
George L. Platzer, Jr.
BY Harness & Harris
ATTORNEYS

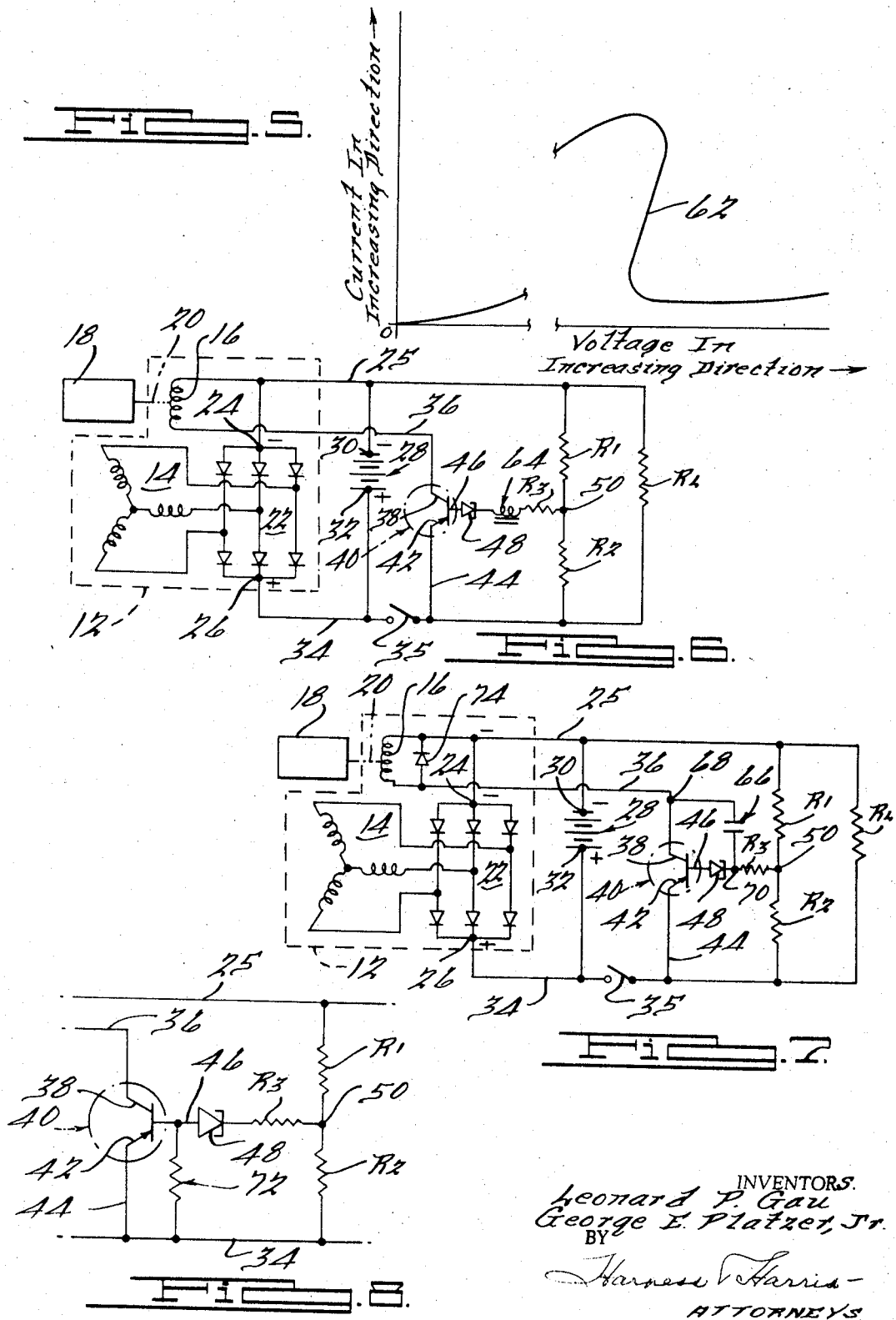

United States Patent Office 3,439,250
Patented Apr. 15, 1969

3,439,250
VOLTAGE REGULATOR
Leonard P. Gau, Birmingham, and George E. Platzer, Jr., Southfield, Mich., assignors to Chrysler Corporation, Highland Park, Mich., a corporation of Delaware
Continuation of application Ser. No. 297,264, July 24, 1963. This application Oct. 3, 1966, Ser. No. 598,539
Int. Cl. H02j 7/10
U.S. Cl. 320—64                                    15 Claims

ABSTRACT OF THE DISCLOSURE

A voltage regulator for limiting the magnitude of the output voltage applied to a load, including a storage battery, by a vehicular electro-mechanical source of current having an energizable field winding the current through which is controlled by a switching circuit comprising a transistor connected in output current controlling relation with the field winding and a voltage responsive circuit which includes a voltage divider connected across the load and a tunnel diode connected to the voltage divider and the control input of the transistor.

---

This application is a continuation of copending application Ser. No. 297,264 filed July 24, 1963, now abandoned.

This invention relates generally to regulators for automotive and similar electrical systems incorporating a storage battery and generator means that may be driven over a wide range of speeds and more particularly to regulators for regulating the output of said generator means in order to limit the magnitude of the generated voltage applied to the storage battery.

In the past conventional voltage regulators were of the electro-mechanical variety. That is, they are comprised of mechanical spring biased contacts operated by solenoids in order to make and break an electrical circuit theeby providing a degree of voltage regulation.

Such mechanical contacts have often proven to be a source of failure. That is, accurate initial adjustment is difficult to attain and, if attained, virtually impossible to maintain over any extended period of use. A further undesirable characteristic of the prior art is the pitting of the contacts due to the electrical arcing therebetween whenever the contacts are opened. Deterioration of the contacts is also brought about through oxidation which is accelerated by exposure to moisture.

Various attempts have been made to correct the above problems. For example, some have employed heremetically sealed housings. This has, in many instances, prevented accurate adjustment of the voltage regulator subsequent to assembly thereof.

Others have attempted using a desiccant within the housing. However, after either prolonged or repeated short intervals of exposure to moisture laden air, the desiccant loses its effectiveness.

In order to circumvent the problems attendant electromechanical voltage regulators, various arrangements have been proposed whereby generator voltage regulation is achieved by the use of transistors. In such arrangements, the transistor has usually been connected in series with the control winding (field winding) of the power source whether that power source was a direct-current generator or an alternating-current generator. Presently, especially in the automotive industry, such alternating-current generators are commonly referred to as alternators. Suitable rectifying means are normally provided in order to adapt the alternator output to the direct current electrical system of automotive vehicles.

Such transistorized voltage regulators can be classified into two general categories the first of which would include those regulators employing electro-mechanical relays having movable electrical contacts which open and close in order to cause an associated transistor to become conductive or non-conductive thereby energizing or de-energizing the generator field winding. The second category would include those regulators having a transistor whose emitter and collector terminals are in series with the generator field winding and whose base is connected, through an inverting stage consisting of a second transistor and suitable resistor means, to a Zener diode.

Neither of the said two categories of voltage regulators have enjoyed and substantial degree of acceptance. The first category, wherein electro-mechanically actuated contacts are employed to trigger an associated transistor, fall far short of realizing the full potential of a transistorized system. The electrical contacts are still retained and are, even though carrying current at a relatively low voltage, still subject to deterioration by oxidation. Further, such contacts and associated relay must still be initially adjusted which adjustment has been found to be critical.

The second category, although devoid of mechanical contacts, necessitates the use of at least two transistors. Consequently, the cost of such multiple transistors renders the use thereof prohibitive except for a few specialized applications.

Further, the Zener diode triggered double transistor voltage regulator must he added thereto suitable means for temperature compensation. That is, when the storage battery temperature is relatively low a relatively higher voltage has to be impressed thereacross in order to properly charge the battery. After the storage battery temperature increases, as by the effects thereon of rising ambient temperatures, a relatively lower voltage has to be impressed thereacross in order to prevent damage to the battery since the battery charging rate increases with temperature.

It is therefore, a general object of this invention to provide a novel and improved voltage regulating circuit which is not dependent on any mechanical switching devices and which requires the use of only one transistor.

Another object of this invention is to provide a novel and improved voltage regulating circuit comprised of a tunnel diode and a transistor.

Other objects and advantages will become apparent when reference is made to the following description and accompanying drawings wherein:

FIGURE 1 is a schematic circuit diagram of a voltage regulating circuit, constructed in accordance with the teachings of this invention, illustrated in conjunction with an alternating-current generator;

FIGURE 2 is a graph illustrating the characteristic operating curve of one of the elements disclosed in FIGURE 1;

FIGURE 3 is a schematic branch circuit of the general circuit illustrated in FIGURE 1;

FIGURE 4 is a graph illustrating a characteristic operating curve of a selected combination of elements shown in FIGURES 1 and 3;

FIGURE 5 is a graph illustrating, generally, a modified version of the characteristic curve of FIGURE 4 obtainable at certain operating conditions;

FIGURE 6 is a schematic circuit diagram illustrating a second embodiment of the invention;

FIGURE 7 is a schematic circuit diagram illustrating a third embodiment of the invention; and FIGURE 8 is a schematic wiring diagram of a portion of FIGURE 1 illustrating a modification of the invention applicable to the embodiments of FIGURES 1, 5 and 7.

Referring now in greater detail to the drawings, FIGURE 1 illustrates a voltage regulating circuit 10, constructed in accordance with this invention, connected with an alternating-current generator (alternator) 12.

The alternator 12 has a three-phase Y-connected output winding 14 and a field winding 16 that is driven by an engine 18 through suitable torque transmiting means 20. The field winding 16, as well known to those skilled in the art, is the rotatable part of the alternator. The stator or output winding 14 is connected with a three-phase rectifier 22 having a negative output terminal 24 and a positive output terminal 26.

A battery 28 has its negative terminal 30 connected to one side of the field winding 16 and output terminal 24, by means of conductor 25, while its positive terminal 32 is connected in parallel, by means of conductor 34, to the positive terminal 26 of the rectifier 22. Also, connected to conductors 25 and 34, in parallel relationship to battery 28, is a resistance load, $R_L$.

The other side of the field winding 16 is connected, through a suitable conductor 36, to the collector electrode 38 of transistor 40. The emitter electrode 42 is, in turn, connected as by conductor 44 to conductor 34. The base electrode 46 is serially connected with a tunnel diode 48 and a suitable resistance, $R_3$, which in turn are connected, as at 50, to a conductor intermediate resistance $R_1$ and $R_2$ which comprise a voltage divider across conductors 25 and 34. The flow of current through the field winding 16 is controlled by the conduction or non-conduction of transistor 40.

The tunnel diode 48 can be used as a bistable semi-conductor with a characteristic operating curve 51, as illustrated in FIGURE 2, having a portion thereof wherein current flow through the diode decreases with an increase in voltage. This negative resistance effect occurs generally between two other portions of the operating curve wherein an increase in current flow through the diode is experienced as the voltage thereacross increases.

It has now been discovered that a tunnel diode can be combined in such a manner with a transistor so as to have the combination exhibit a characteristic operating curve which can be employed for regulating the output voltage of a variable speed generator.

In order to better illustrate this combined characteristic operating curve, let the circuit of FIGURE 3, which is basically a portion of the circuit of FIGURE 1, be considered and for purposes of illustration let it be assumed that 52 represents a source of variable electrical potential. The current flow through the circuit of FIGURE 3 can be graphically plotted, as illustrated in FIGURE 4, for increasing values of voltage.

Referring to FIGURES 3 and 4, it can be seen that in portion 54 of curve 53 the current increases to a value $I'_1$ as the voltage increases to a value of $V'_1$. However, as shown by portion 56 of the curve, any increase in voltage over the value of $V'_1$ causes a corresponding decrease in current from the value $I'_1$ to a substantially lesser value of $I'_2$. Any subsequent increase of voltage from the value of $V'_2$ again causes a corresponding increase in current flow as illustrated by portion 58 of the curve.

The graph of FIGURE 4 illustrates, of course, the current flow not only through the tunnel diode 48, but also through the base and emitter electrodes of the transistor 40. Since a transistor is basically a device for current amplification, the current flow through the base electrode can be used for controlling the current flow through the emitter-collector circuit of the transistor in order to control the supply of current to the generator field winding 16 for energization thereof.

Referring to FIGURE 1, the voltage divider, comprised of resistors $R_1$ and $R_2$, being connected in parallel with the output terminals 24 and 26 of the generator output winding 14 and also in parallel relationship with the terminals of the battery 28, will continually exhibit a voltage at 50 (as measured, for example, from point 50 to conductor 44) which is proportional to the then existing generator output voltage. The voltage so produced by the voltage divider can then be employed as the control voltage as represented by the various values of V' of FIGURE 4. V', as applied to the circuit of FIGURE 1 would have the following relationship:

$$V' = V \times \frac{R_2}{R_1 + R_2}$$

Where V was the voltage, at any particular instant across conductors 25 and 34.

In view of the above and with reference to FIGURE 4, it can be seen that should the terminal voltage of the output winding 14 vary from a predetermined desired level that the voltage regulating circuit of FIGURE 1 effectively corrects for each variation.

For example, let it be assumed that the terminal voltage of the generator 12 is at the maximum acceptable value. At this time, through a selection of resistors $R_1$ and $R_2$ proper for the particular environment, the voltage across the emitter, base and tunnel diode circuit will be at a value of $V'_1$ with the current flow therethrough also being at the maximum value of $I'_1$ (FIGURE 4). Transistor 40 will, of course, be properly biased at this time so as to be conductive thereby allowing current flow through conductor 44, emitter electrode 42, collector electrode 38, conductor 36, field winding 16, conductor 25, battery 28, conductor 34 and ignition controlled switch 35. The field winding 16 being thusly energized causes the output winding 14 to produce the desired maximum voltage at terminals 24 and 26.

If the terminal output voltage should begin to increase, as for example caused by an increase in the speed of rotation of the field winding 16 by the engine 18, the current flow through the base-diode circuit immediately diminishes in accordance with portion 56 of the composite curve of FIGURE 4. Consequently, the current flow through the emitter-collector circuit of the transistor 40 is drastically reduced causing the field winding 16 of generator 12 to be de-energized.

The circuit of FIGURE 1 also has the ability to automatically and continuously compensate for temperate variations in the battery which will occur as a result of, for example, prolonged exposure to increasing ambient temperatures. That is, transistor 40 exhibits a characteristic which can be advantageously employed for achieving the desired temperature compensation.

As the temperature of the transistor increases (also due to the rise in ambient temperature) the voltage required, across the emitter-base electrodes, for maintaining a particular value of current flow therethrough, decreases. This characteristic can be graphically illustrated in FIGURE 4 by the heavy dash-line curve 60 displaced some amount to the left of the composite curve 53 illustrated in solid line. Accordingly, in comparing curves 60 and 53 it can be seen that for a lesser voltage value of $V'_3$ the same maximum value of current $I'_1$ is obtained. Therefore, at increased temperatures any increase over a reduced value of voltage, in this case $V'_3$, will immediately cause a reduction in the current flow to the field winding 16 as previously described.

Even though curve 53 of FIGURE 4 is characteristic of the tunnel diode and transistor combination, the slope of 56 is influenced by the resistor, $R_3$, connected in series therewith. That is, generally, as the value of the resistance $R_3$ increases portion 56 tends to become more vertically inclined. Further, it should be apparent that the slope of portion 56 is indicative of the regulating response of the circuit. Therefore, it is desirable to select a resistor, $R_3$, having a resistance value which will cause portion 56 to assume a slope which will result in a regulating response most advantageous to the requirements of the environmental circuitry. In automotive applications, such as that disclosed herein, it is preferred to have the slope of portion 56 closely approach a vertical position.

In one successful embodiment of the invention as disclosed by FIGURE 1, the circuit constants were as follows:

| | |
|---|---|
| Transistor 40 | 2N1167. |
| Resistor $R_1$ | 40 ohms. |
| Resistor $R_2$ | 0.75 ohms. |
| Resistor $R_3$ | 0.40 ohms. |
| Tunnel diode 48 | IN3850. |
| Battery 28 | Nominally 12 volts. |

In many instances the slope portion 56 can not be made to be as vertically disposed as desired because of other influencing factors. That is, because of the inherent characteristics of the transistor (and possibly the further influence of the resistor $R_3$ in series therewith) the tendency of portion 56, during periods of temperature increase, is to become more vertically disposed. Further, it has been found that if the slope of portion 56 is initially made vertical or nearly vertical that upon a substantial temperature increase, because of these same characteristics, that the slope will even become positive, thereby displaying a characteristic curve with a hook back portion 62 as illustrated generally in FIGURE 5.

Accordingly the embodiment of FIGURE 6 employs means which when added to the basic circuitry of FIGURE 1, will create an effect which closely approximates a vertically disposed portion 56 without permitting the occurrence of a positive slope as that indicated by portion 62 of the curve of FIGURE 5.

All elements in FIGURE 6 which are like or similar to those of FIGURE 1, are identified with like reference numbers. Reference to FIGURE 6 will disclose that an inductance 64 has been added in series with the resistor $R_3$ and the diode 48. Inductance, of course, is that property of an electric circuit that opposes any change in current in that circuit. Not only does the inductance oppose the change in the current, the effect of the inclusion of such inductance means is that the inductance itself attempts to maintain the same condition of current even though some switching device in series therewith has become open. Accordingly, if it is assumed that the generator terminal voltage has reached the maximum desirable value, reference to FIGURE 4 will clearly show that the diode 48 begins to exhibit a negative resistance effect causing the current flow therethrough to diminish. The inductance, however, being connected in series with the diode resists the change in current flow and, at least momentarily, attempts to maintain the same value of current therethrough. The momentary attempt to maintain constant current flow through the inductance in t urn causes the diode to experience an increased voltage drop across itself. Accordingly by the use of such inductance means, it is possible to then employ a resistor, $R_3$, of a resistance value which does not cause the slope 56 of curve 53 to closely approach the vertical thereby avoiding possibility of portion 56 subsequently becoming the hook portion 62 as shown in FIGURE 5. Accordingly even though the voltage divider device has not experienced an increase in terminal voltage, the inductance, because of its effect on the diode current, causes diode 48 to experience a momentary increased voltage, thereby producing a regulating response identical to, or at least closely approaching that, which would be achieved by the use of a resistor $R_3$ which would have initially caused portion 56 to be vertically disposed.

In a particular successful embodiment of the invention as disclosed by FIGURE 6, the circuit constants were as follows:

| | |
|---|---|
| Transistor 40 | 2N2148. |
| Resistor $R_1$ | 25.0 ohms. |
| Resistor $R_2$ | 1.5 ohms. |
| Resistor $R_3$ | 0.5 ohm. |
| Tunnel diode 48 (Obtained from R.C.A. Materials Div.) | #37134. |
| Inductor 64 | 10.0 mh. |
| Battery 28 | Nominally 12 volts. |

FIGURE 7 illustrates another embodiment of the invention. All elements in FIGURE 7 which are like or similar to those of FIGURES 1 and 6 are identified with like reference numbers. The circuitry of FIGURE 7, when compared to that of FIGURE 1, includes a capacitor 66 connected as at point 68 to conductor 36 and connected as at 70 intermediate the tunnel diode 48 and resistance $R_3$.

It has been discovered that the inclusion of a capacitor 66, as illustrated, provides a substantially identical effect as that achieved by the use of the inductor 64 of FIGURE 6. That is, apparently the capacitor maintains conduction through the transistor and tunnel diode, during that period as when the tunnel diode begins to operate on the negative resistance portion of its characteristic operating curve, thereby acting as a current feed-back means. A rectifier, or other suitable means as well known in the art, may be placed in parallel with the field 16 to absorb transients that may otherwise damage the transistor 40.

In one successful embodiment of the invention as disclosed by FIGURE 7, the circuit constants were as follows:

| | | |
|---|---|---|
| Transistor 40 | | 2N511 |
| Resistor $R_1$ | ohms | 26.0 |
| Resistor $R_2$ | do | 1.0 |
| Resistor $R_3$ | do | 3.0 |
| Tunnel diode 48 | | 1N3150 |
| Capacitor 66 | mf | 0.1 |
| Battery 28 | | Nominally 12 volts |

Further it has been discovered that in situations wherein the circuitry of the invention is to be exposed to relatively high ambient temperatures that beneficial results are obtained by the addition of suitable resistance means 72 as illustrated in FIGURE 8. Such a shunt resistance 72 connected to the transistor base electrode 46 and conductor 34, provides a path for collector-base leakage current, as incurred at increased temperatures, thereby preventing amplification of such leakage current by the transistor.

Each of the embodiments of FIGURES 1, 6 and 7 can be modified by the inclusion of such shunt resistance means as illustrated in FIGURE 8.

The various forms of the invention have been disclosed in conjunction with the A.C. generator, commonly referred to as an alternator. It should be apparent, however, that the invention is not limited to such generators and that the philosophy of the circuitry comprising the invention is applicable to direct current generators. Further, it should be apparent that the various values of the components as disclosed herein are presented merely as examples and not intended to in any way limit the scope of the invention.

The transistors as disclosed are of the P-N-P variety. However, it will be apparent to those skilled in the art that the invention can be practiced equally well by using N-P-N transistors since such alternative use merely requires appropriate reversal of polarities.

Switch 35 has been referred to as an ignition controlled switch. The purpose of such a switch, as well known in the art, is to prevent the battery 28 from discharging during such periods as engine shut-down. Accordingly, any apparatus capable of performing such a function would be acceptable since the inclusion or absence thereof in no

We claim:

1. A voltage regulator for a vehicular electromechanical source of current having a field winding and having output terminal means for supplying power to an electrical load of a vehicle including a storage battery, said regulator including in combination, first and second conductors for connection to the source of current, a transistor having an input electrode and further having output electrodes connected between one of said conductors and said field winding to control current in the field winding, and voltage sensitive switch means including a voltage divider circuit connected across said first and second conductors, said voltage sensitive switch means comprising a tunnel diode electrically connected between said input electrode and said voltage divider, said tunnel diode thereby exhibiting astable characteristics so as to decrease the conductivity through said output electrodes and said field winding upon sensing in said voltage divider circuit a voltage value in excess of a predetermined maximum voltage value.

2. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, voltage sensitive switch means including a voltage divider circuit connected across said first and second conductors, said voltage sensitive switch means comprising a tunnel diode electrically connected to said input electrode and said voltage divider, and capacitor means connected to said tunnel diode and said voltage divider at a point therebetween and connected to said field winding at a point between said field winding and said output electrodes.

3. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, and voltage sensitive switch means including a voltage divider circuit connected across said first and second conductors, said voltage sensitive switch means comprising a tunnel diode electrically connected in series with inductance means to said input electrode and said voltage divider.

4. A voltage regulator according to claim 3 including additional shunt resistance means connected between said input electrode an dsaid one of said conductors.

5. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, and voltage sensitive switch means including a voltage divider circuit connected across said first and second conductors, said voltage sensitive switch means comprising a tunnel diode electrically connected in series with additional resistance means between said input electrode and said voltage divider, said tunnel diode thereby exhibiting astable characteristics so as to decrease the conductivity through said output electrodes and said field winding upon sensing in said voltage divider circuit a voltage value in excess of a predetermined maximum voltage value.

6. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, voltage sensitive switch means including a voltage divider circuit connected across said first and second conductors, said voltage sensitive switch means comprising a tunnel diode electrically connected to said input electrode and said voltage divider, and capacitor means arranged in parallel relationship to said tunnel diode and said transistor.

7. A voltage regulator according to claim 6 including additional shunt resistance means electrically connected to said input electrode and said one of said conductors.

8. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, voltage sensitive switch means including a voltage divider circuit connected across said first and second conductors, said voltage sensitive switch means comprising a tunnel diode electrically connected in series with first resistance means to said input electrode and said voltage divider, and additional shunt resistance means electrically connected to said input electrode and said one of said conductors.

9. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, voltage sensitive switch means including a voltage divider circuit connected across said first and second conductors, said voltage sensitive switch means comprising a tunnel diode electrically connected to said input electrode and said voltage divider, and additional shunt resistance means electrically connected to said input electrode and said one of said conductors.

10. A voltage regulator for an electromechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, and voltage sensitive switch means including a voltage divider circuit connected across said first and second conductors, said voltage sensitive switch means comprising a tunnel diode electrically connected in series with resistance means and inductor means to said transistor input electrode and said voltage divider circuit.

11. A voltage regulator according to claim 10 including additional shunt resistance means electrically connected to said input electrode and said one of said conductors.

12. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, a voltage divider circuit connected across said first and second conductors, a resistor connected at one end thereof to said voltage divider circuit, and a tunnel diode connected at one end thereof to said input electrode and connected at another end thereof to another end of said resistor, said tunnel diode thereby exhibiting astable characteristics so as to decrease the conductivity through said output electrodes and said field winding upon sensing in said voltage divider circuit a voltage value in excess of a predetermined maximum voltage value.

13. A voltage regulator for an electro-mechanical source of current having a field winding and having output terminal means for supplying power to an electrical load including a storage battery, said regulator including in combination, first and second conductors for connection to the source of current, a transistor having an input electrode and further having output electrodes connected between one of said conductors and said field winding to control current in the field winding, a voltage divider circuit connected across said first and second conductors, a resistor connected to said voltage divider circuit, a tunnel diode connected to said input electrode, and inductor means serially connected between said tunnel diode and said resistor.

14. A voltage regulator according to claim 13 including additional shunt resistance means electrically connected between said input electrode and said one of said conductors.

15. A voltage regulating circuit for an alternator having a field winding and output terminal means, first and second conductor means for connection to said output terminal means, said first and second conductor means comprising first circuit means including an electrical load and a storage battery respectively electrically connected across said first and second conductor means, voltage dividing means comprising first and second serially connected resistance means electrically connected across said first and second conductor means, a transistor having a base electrode, emitter electrode and a collector electrode, said emitter electrode being electrically connected to said first conductor means, said field winding being electrically connected at one end to said second conductor means and being connected at the other end to said collector electrode, a tunnel diode connected in series with said base electrode, and additional resistance means connected in series with said tunnel diode and said voltage dividing means at a point intermediate said first and second resistance means.

References Cited

UNITED STATES PATENTS

| | | | |
|---|---|---|---|
| 3,201,681 | 8/1965 | Van Wilgen et al. | 323—22 X |
| 3,204,174 | 8/1965 | Clerc | 323—22 |
| 3,214,608 | 10/1965 | Mollinga | 307—88.5 |
| 3,217,229 | 11/1965 | Ballard | 320—68 |
| 3,304,488 | 2/1967 | Henderson et al. | 322—73 X |
| 3,311,786 | 3/1967 | Peras | 307—202 X |

OTHER REFERENCES

Electronics—"Combining Transistors With Tunnel Diodes," Aug. 19, 1960, pp. 59–61.

Hughes Aircraft Co., Semiconductor Advance Data, September 1960.

JOHN F. COUCH, *Primary Examiner.*

S. WEINBERG, *Assistant Examiner.*

U.S. Cl. X.R.

322—28, 73; 323—39